(12) United States Patent
Wong et al.

(10) Patent No.: US 7,382,928 B2
(45) Date of Patent: Jun. 3, 2008

(54) DIGITAL IMAGE PROCESSING SYSTEM AND METHOD FOR PROCESSING DIGITAL IMAGES

(75) Inventors: Kam Fai Wong, Hong Kong (CN); Xiaoou Tang, Hong Kong (CN); Ying Fai Ho, Hong Kong (CN); Kwok Yiu Leung, Hong Kong (CN); Hoi Chung Chu, Hong Kong (CN)

(73) Assignee: The Chinese University of Hong Kong, Hong Kong (CN)

( * ) Notice: Subject to any disclaimer, the term of this patent is extended or adjusted under 35 U.S.C. 154(b) by 701 days.

(21) Appl. No.: 10/913,895

(22) Filed: Aug. 6, 2004

(65) Prior Publication Data

US 2005/0123211 A1   Jun. 9, 2005

(30) Foreign Application Priority Data

Dec. 9, 2003   (CN) .................. 2003 1 0117256

(51) Int. Cl.
  *G06K 9/00*   (2006.01)

(52) U.S. Cl. ..................................... 382/254; 382/167
(58) Field of Classification Search ................ 382/167, 382/172, 274, 279, 261
  See application file for complete search history.

(56) References Cited

U.S. PATENT DOCUMENTS 5,668,890 A * 9/1997 Winkelman .................. 382/167
6,807,300 B1 * 10/2004 Gindele et al. ............. 382/167

* cited by examiner

*Primary Examiner*—Jingge Wu
*Assistant Examiner*—Jayesh A Patel
(74) *Attorney, Agent, or Firm*—Knobbe Martens Olson & Bear LLP (57) ABSTRACT

Disclosed is an automatic digital image enhancement method, including: determining the defects existing in the image based on pixel values, such as pixel luminance values and pixel color values, of the input digital image, and making corrections based on the determination results. The method can process images of digital photos, digital videos and make enhancement on exposure and color of the images. The method disclosed can also improve quickly and apparently the visual quality and appearance of images.

7 Claims, 9 Drawing Sheets

Original 64×48 image divided into 4×3 rectangle blocks of block size 16×12

Down-scaled 4×3 image

DIGITAL IMAGE PROCESSING SYSTEM AND METHOD FOR PROCESSING DIGITAL IMAGES

RELATED APPLICATIONS

The present application claims the benefit of Chinese patent application No. 200310117256.2 filed on Dec. 9, 2003, entitled the same, which is explicitly incorporated herein by reference in its entirety.

BACKGROUND OF THE INVENTION

1. Field of the Invention

The present invention relates to an image processing technology, particularly, to a method for processing digital images in order to automatically improve and enhance the visual quality of the digital images.

2. Description of the Related Technology

With the development of digital technology, digital cameras and digital video cameras have already entered into people's life. The remarkable difference between a digital camera and an ordinary photographic camera is that the digital camera stores a picture in numeric data. However, the digital camera does not use a roll of the film as that used in the ordinary photographic camera. This makes the digital camera smaller in size and easier to carry. In addition, digital images can be transferred to different kinds of image processing devices. By using these image process devices, various image post-processing techniques can be applied to images to improve the quality thereof when the images involve defects such as backlighting defects, underexposure defects, overexposure defects, contrast defects and color casting defects. The resulting quality of the processed photos may not be possibly produced by optics lens photography.

Photos taken by the digital camera are not always desirable. Firstly, the automatic exposure system of the digital camera is not always correct. For instance, due to wrong exposure detection, faces of a portrait photo taken under strong backlight may be underexposed. Furthermore, due to the loss of dynamic range when the image is digitized or compressed by a lossy compression algorithm (like JPEG or MPEG), in recording scenes with a very high dynamic range, digital cameras will make compromises that allow only the important part of the scene captured. As a result, some parts of the captured image may be washed out or flattened. The captured image will be very different from what human eyes can see in the real situation. On the other hand, the power of typical build-in flashlight is normally not powerful enough to fill on the distant objects. In a more extreme case, some cheaper cameras do not have a build-in flashlight. As a result, photos taken in dim environment are dark and the objects cannot be seen clearly. Accordingly, there is an essential need to make enhancement on digital images taken by digital cameras in order to get good photos under varies lighting conditions.

In existing automatic photo enhancement processes, methods of "Auto Level" and "Auto Contrast" only try to globally widen the dynamic range of an image. Poorly exposed photo with full dynamic range cannot be corrected by these methods. For example, the current methods cannot correct a backlight photo that has a very high contrast and full dynamic range. For the automatic method of "Histogram Equalization", a global transformation function is constructed for a specific image. This algorithm just works well in case the histogram of the image is uniform, whereas some parts of the image are too bright and the other parts are too dark. If the histogram of an image does not have a uniform property, histogram equalization may produce erroneous color and unnatural looking. For example, the face of a person in the image will become very dull. The methods mentioned above do not identify whether exposure defects exist on an image or not. They just try to modify an input image until the output image satisfies certain statistic criterions. With such a criterion, undesirable results may be produced. In reality, to enhance a digital image by software, a user has to adjust different parameters manually (e.g. levels, curves, brightness, contrast and saturation). This involves lots of trials and errors. Since these enhancement methods always adjust images globally, regions of the image that are originally good may be distorted (e.g. washed out or flattened) after being processed.

SUMMARY OF CERTAIN INVENTIVE ASPECTS OF THE INVENTION

In view of the fact that the enhancement methods in the prior art are inefficient, one aspect of the present invention provides a method for automatic digital image and video enhancement. By analyzing on the digital image, defects on an image are determined and appropriate corrections will be made in order to improve the visual quality and appearance of the image. Besides, as the process this invention is quick and fully automatic, this avoids users from tedious manual operations on enhancing large amounts of digital images. The method for processing a digital image of the present invention comprises: detecting pixel values of pixels in the digital image; determining whether or not a defect exists in the digital image by comparing the pixel values with a predetermined value; and correcting the defect by adjusting the pixel values, if the defect exists.

In one embodiment, the pixel value is preferably a luminance value or a color value of pixels in the processed image.

Another aspect of the present invention provides an automatic image processing system for enhancing a digital image, which comprises: image defect detection means for detecting pixel values of the digital image to determine whether a defect exists in the image; and image correction means for correcting the defect if the defect exists in the image.

In one embodiment, the image defect detection means may comprise one or more detection modules detecting values of pixels in the digital image to determine whether the digital image is an underexposed and/or overexposed and/or color-casted and/or details-shaded and/or blue chunk noise one, and the image correction means comprises one or more correction modules correcting the defect image, correspondingly.

Various embodiments of the present invention can perform processing a digital image with defects including one or more as follows: underexposure, overexposure, poor contrast, uneven exposure, backlighting and color casting, hereby improving visual quality of the digital images (including still images and videos).

DETAILED DESCRIPTION OF CERTAIN EMBODIMENTS OF THE INVENTION

By reference to the drawings, the invention will be further described in details, and artisan in this field can clearly understand the inventive concepts and ideas of this invention.

Figure 1:
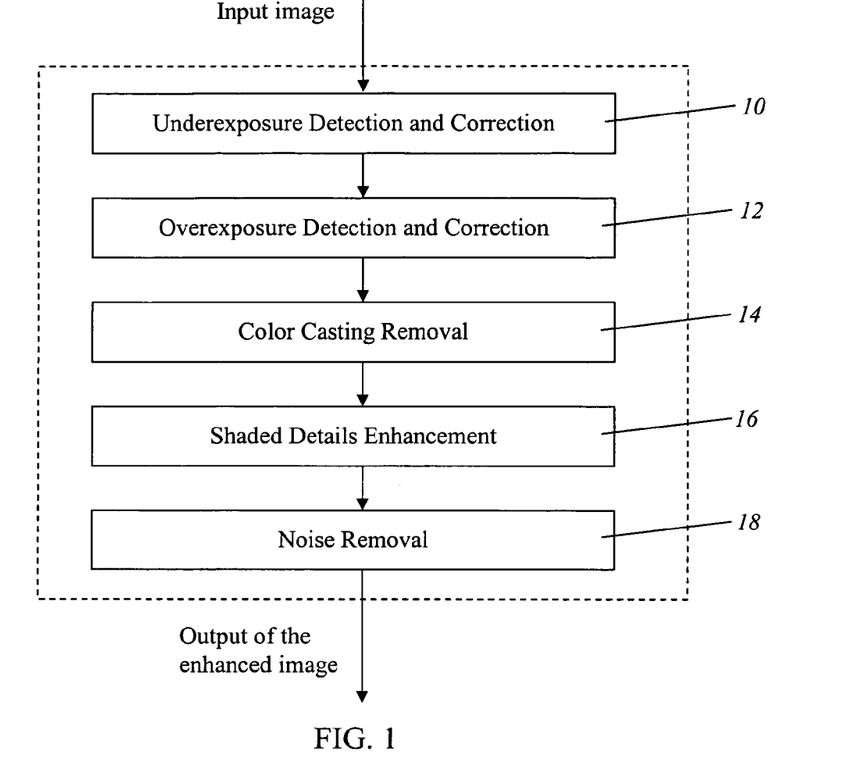
FIG. 1 is a block diagram of a digital image processing system of the present invention in which different modules of processors are used to process an input image.

The present invention provides a method for processing digital images in which defects exist. As shown in FIG. 1, an embodiment of the method according to the invention processes an image by the steps as follows: underexposure detection and correction (10), overexposure detection and correction (12), color casting removal (14), shaded details enhancement and noise removal (16, 18). Those skilled in the art will readily understand that one or more steps can be used alone or together in accordance with defects that exist in an image to be processed. An image processed by the method of the invention will have improved visual quality and appearance and the image will be restored similar to what human eye can see as in the real situation.

The method of the invention is exploited by a system of the invention, which is another object of the invention. Corresponding to the steps of the method of processing the image, the system according to the invention comprises a detection module detecting luminance values of pixels in the digital image to determine whether the digital image is an underexposed and/or overexposed, or color values of pixels in the digital image to determine whether the image is color-casted and/or details-shaded and/or blue-chunk noised, and a correction module correcting the defect image.

Figure 2:
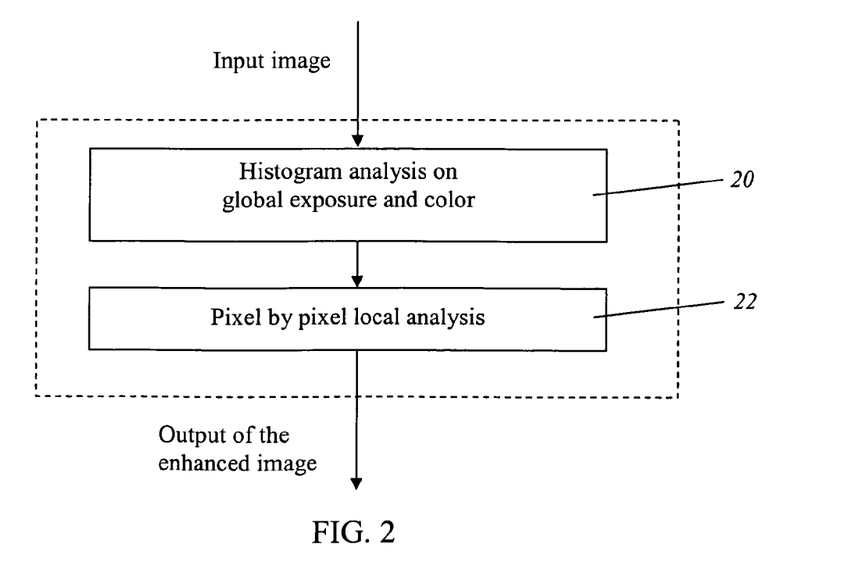
FIG. 2 is a block diagram of a digital image processing system of the present invention, which shows an input image is processed globally and then locally to obtain an output image.

Referring to FIG. 2, the method of the invention can be viewed as two parts. In the first part, the system analyzes a histogram of an input image globally (20). Based on the analysis to the histogram, the system makes corrections on the global exposure and color of the image by an underexposure correction module, an overexposure correction module, a color casting removal module, if corresponding defects exist in the image. The second part is to locally analyze every pixel of an image and adaptively correct the exposure and the contrast of every pixel with a shaded details enhancement module and a noise removal module (22).

The details of modules used in the system of the invention will be described below. For any digital images mentioned in the below description, the color space used is an RGB color space and the pixel of the image is 24-bit. However, it is understood that other color spaces like a YUV color space can also be used in the system of the invention.

1. Underexposure Detection and Correction

Figure 3:
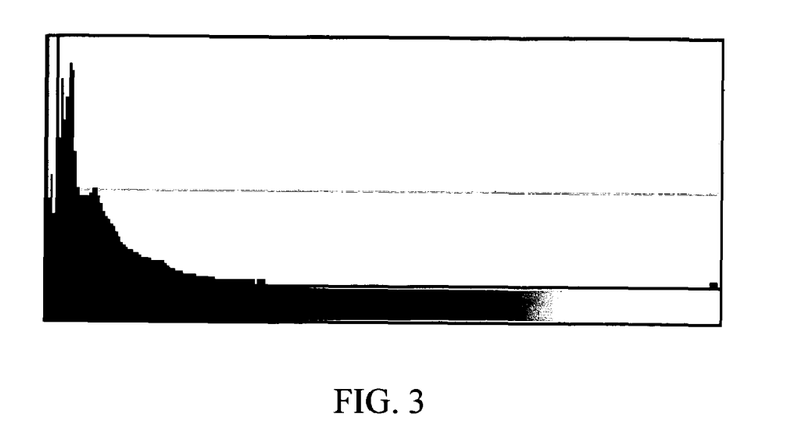
FIG. 3 shows a luminance histogram of an image used in the digital image processing system of the present invention.
Figure 4:
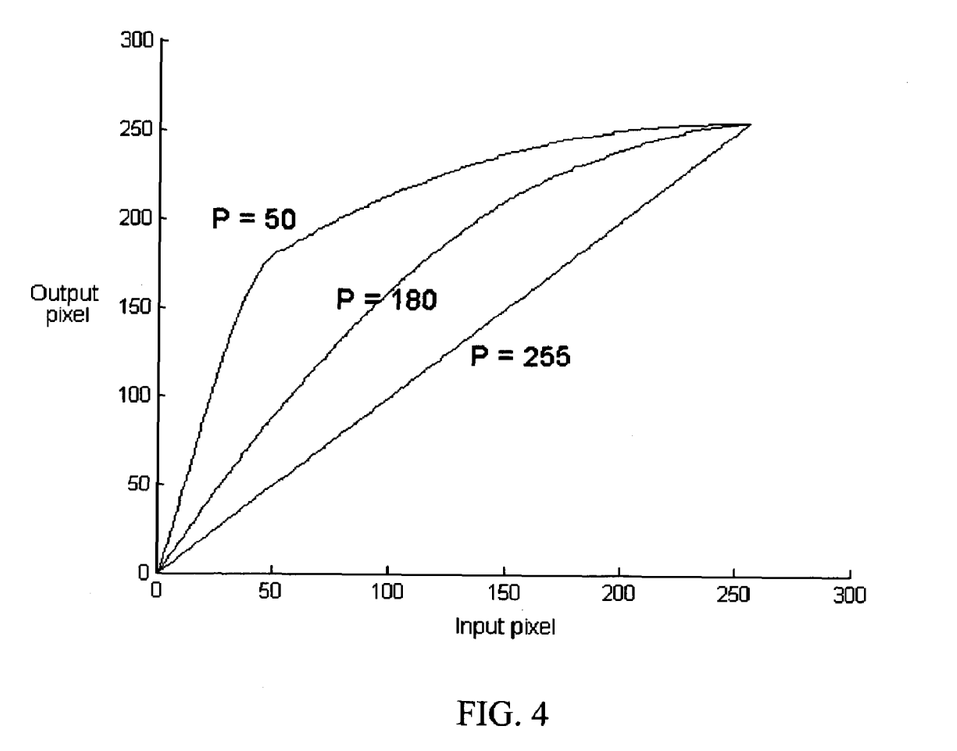
FIG. 4 shows the monotonic increasing transformation functions that are used for underexposure correction to a digital image in the invention.

By excluding P1% (predetermined, e.g. 1%: The purpose for selecting this value is to ignore the effect of some too bright pixels in the image which may interfere the result.) pixels in the image that are considered brightest in the processed image, a highest luminance value P in the rest pixels of the image is detected. For example, the value can simply be detected by using the luminance histogram of the image. If the value of P is smaller than a threshold T1 (e.g. 200), the image is considered lacking bright pixels in the dynamic range and will be corrected. A smaller P implies the image being processed is seriously underexposed and vice versa. Base on the value of P, a transformation function can be applied to correct the image. In the transformation, the pixels of the image will be transformed to larger luminance values. The transformation function starts at (0, 0) and ends at (255, 255). As shown in FIGS. 3 and 4, the smaller the P value is, the steeper the initial slope of the transformation function is and pixel will be brightened more. The corrected image will have a wider dynamic range and contrast.

2. Overexposure Detection and Correction

Figure 5:
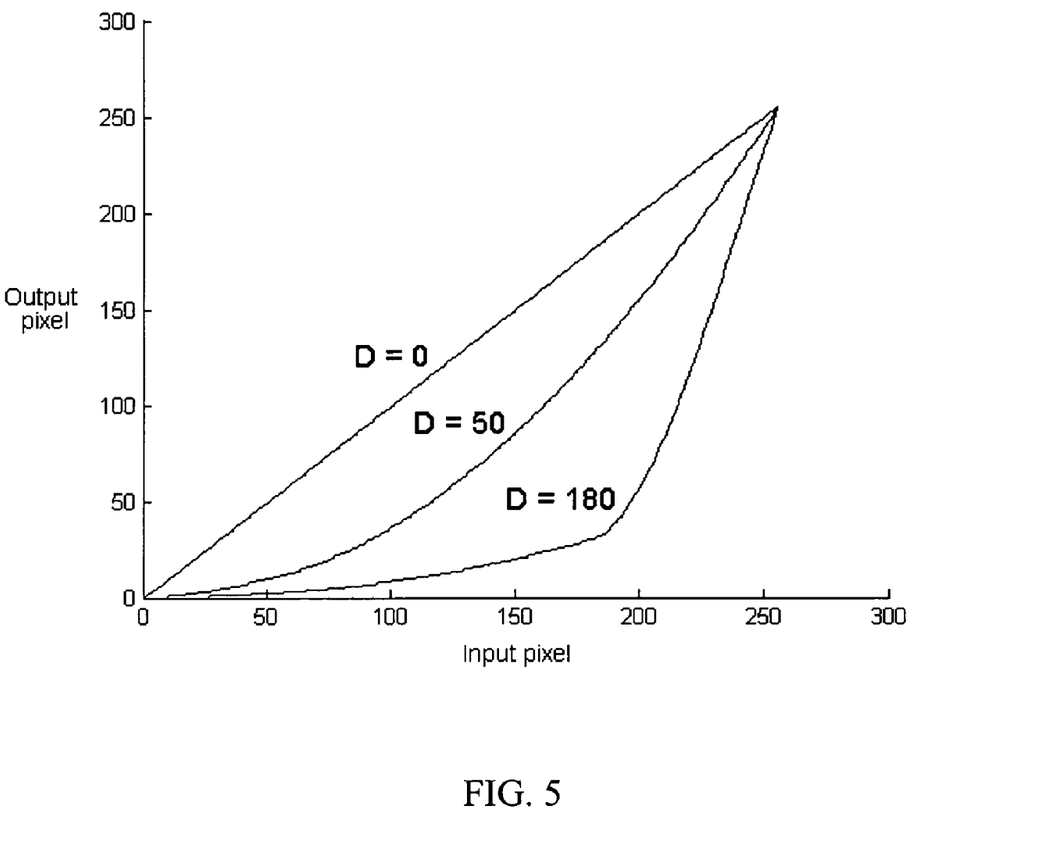
FIG. 5 shows the transformation functions that are used for overexposure correction to a digital image in the invention.

By excluding P2% (predetermined, e.g. 1%: The purpose for selecting this value is to ignore the effect of some too dark pixels in the image which may interfere the result.) pixels in the image that are considered darkest in the processed image, a lowest luminance value D in the rest pixels of the image is detected. For example, the value can simply be detected by using the luminance histogram of the image. If the value of D is larger than a threshold T2 (e.g. 60), the image is considered lacking dark pixels in the dynamic range and will be corrected. A larger D implies the image being processed is seriously overexposed and vice versa. Base on the value of D, a transformation function can be applied to correct the image. In the transformation, the pixels of the image will be transformed to smaller luminance values. The transformation function starts at (0, 0) and ends at (255, 255). As shown in FIGS. 3 and 5, the larger the value D is, the gentler the initial slope of the transformation function is and pixel will be darkened more. The corrected image will have a wider dynamic range and contrast.

3. Color Casting Removal Correction

The color casting removal processing involves an analysis on the brightest pixels and the darkest pixels of the red, green and blue color channels of an image. An assumption for color casting removal correction is that both shadow and highlight pixels of a color casting free image is gray in color.

Figure 6A:
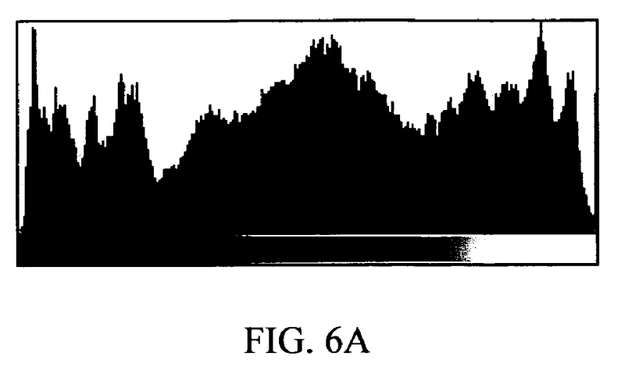
FIGS. 6A though 6C show red, green, blue color channel histograms respectively of a color image used in the invention.
Figure 6B:
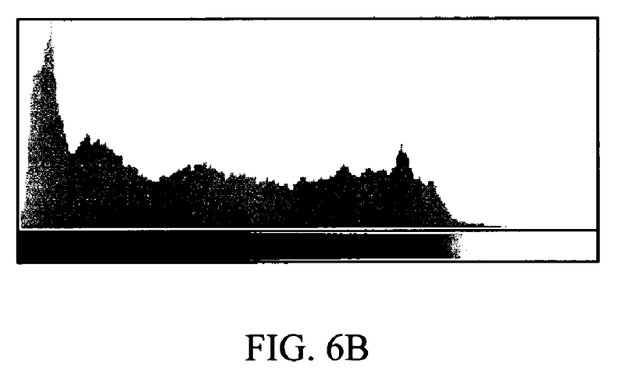
Figure 6C:
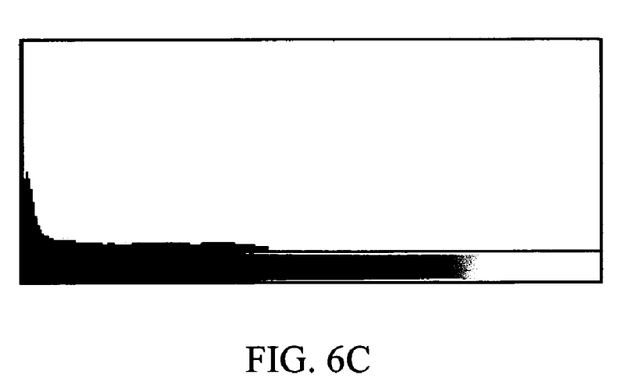

Firstly, the brightest pixel of an image is analyzed to check whether a color casting defect exists in the highlight region. In the red (R), green (G) and blue (B) histogram of the input image being processed, pixels of P3% (e.g. 2%: The purpose for selecting this value is to ignore the effect of some too bright pixels in the image which may interfere with the result.) that are considered brightest in each color channel of the image pixels are excluded. Among the rest pixels, the largest pixel color value in the R, G and B color channels, respectively named as Rmax, Gmax and Bmax, is detected. The maximum color value and the minimum color value among Rmax, Gmax and Bmax are defined as Bright-Max and BrightMin, respectively. A color casting factor CCBright ($0 \leq CCBright \leq 1$) is set proportional to (Brightmax−Brightmin). If a larger (Brightmax−Brightmin) is detected, the image is determined to have a serious color casting defect. Otherwise, a smaller (Brightmax−Brightmin) detected means the image has a minor color casting defect.

To correct the color casting defect in highlight region of the image, based on the CCBright value, the R, G and B color value of each pixel is transformed to a larger value by a corresponding transformation function.

For example, when CCBright of an image is detected equal to 1, the image is determined to have a serious color casting defect, and three monotonic functions will be applied to each color channel to transform each channel of the image such that Rmax, Gmax and Bmax pixel color value of the image are mapped to BrightMax. When CCBright of an image is detected to be 0, the image is determined to have no color casting defect, no color correction is needed for the image. If the image is detected to have little color casting defect (e.g. CCBright=0.3), the R, G and B color value of each pixel will be transformed to a larger value that is smaller than or equal to BrightMax. For example, color pixel value R in the red color channel is to be transformed as R', which is as follows:

$$R'=R \times m$$

where $$m=R\text{max}'/R\text{max, and}$$

$$R\text{max}'=R\text{max}+(\text{BrightMax}-R\text{Max}) \times CC\text{Bright}$$

A similar transformation is applied to green and blue color channels of the image.

Secondly, similar to the above processing, the darkest pixel of an image is analyzed to check whether a color casting defect exists in a shadow region of the image. In the red (R), green (G) and blue (B) histogram of the image being processing, pixels of P4% (e.g. 2%: The purpose for selecting this value is to ignore the effect of some too dark pixels in the image which can interfere the result) that are considered darkest in each color channel of the image are excluded. Among the rest pixels, a darkest pixel color value in R, G and B color channels, respectively named Rmin, Gmin and Bmin is detected. Assume the maximum value and minimum value among Rmin, Gmin and Bmin are defined as DarkMax and DarkMin, respectively. A color casting factor CCDark ($0 \leq CCDark \leq 1$) is defined proportional to (DarkMax−DarkMin).

To correct the color casting defect, based on the CCDark value, the R, G and B color value of each pixel is transformed to a smaller value by a corresponding transformation function. For example, pixel value R in the red color channel is to be transformed as R', which is as follows:

$$R'=R \times m+c$$

where $$m=(255-R\text{min}')/(255-R\text{min}), \text{ and}$$

$$R\text{min}'=R\text{min}-(R\text{min}-\text{DarkMin}) \times CC\text{Dark, and}$$

$$c=-m \times R\text{min}$$

A similar transformation is applied to green and blue color channels of the image. The above processing can balance the color of an image and correct the color casting defect.

4. Shaded Details Enhancement Correction

In the invention, the shaded details enhancement module can be used to correct image details hidden in shaded regions or dark details with poor contrast such that these details become clear, contrasty and more visible. On the other hand, the bright and original good details in the image will not have observable changes or degradation. The processed image will retain its color balance and look natural and details in the image become clearly visible. In other words, the dynamic range of the image is compressed. The steps involved in such a process will be described as follows.

Firstly, each pixel in an image is locally detected to identify whether the pixel is in a shaded area. The weighted mean W of the luminance value of pixels within a predetermined distance (in pixel) adjacent to each pixel is determined. This process can be done by a low pass filter. The filter size for finding W is proportional to the resolution of the image being processed. In a preferred embodiment of the invention, a Gaussian filter can be used.

In certain embodiments of the invention, to expedite such a process, the approximate value W of the luminance value of each pixel can be determined without filtering.

Figure 7:
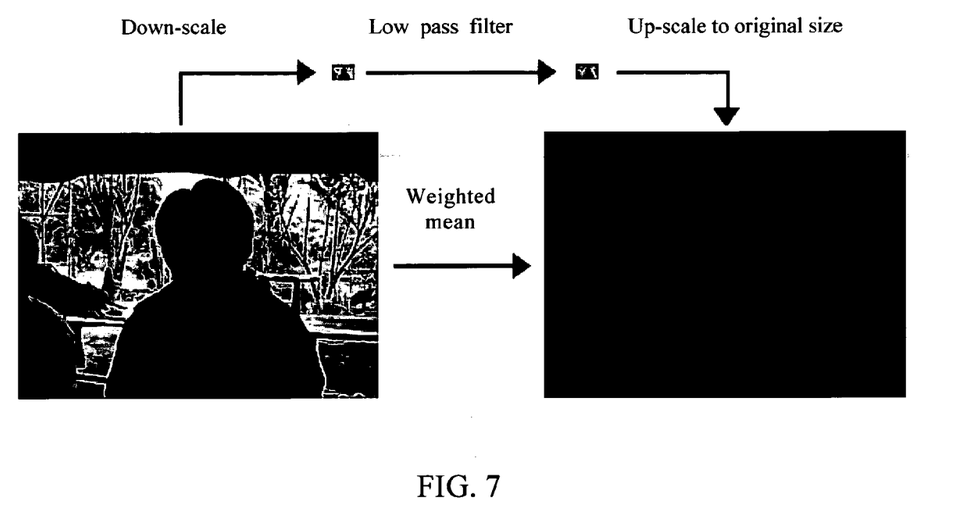
FIG. 7 shows a flow chart for determining the weighted mean of pixels for shaded details enhancement module used in the invention.
Figure 8:
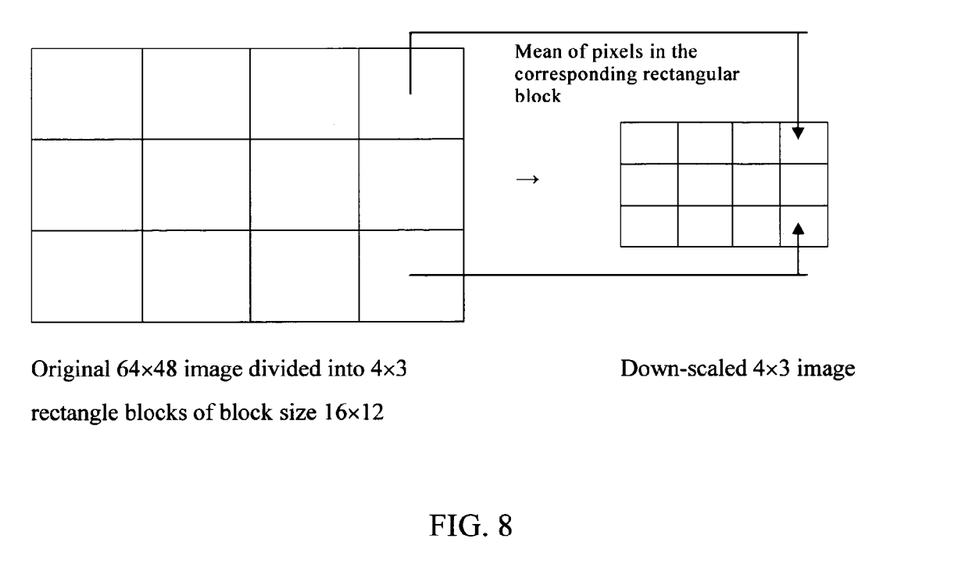
FIG. 8 shows a graphical representation to obtain an image scaled down by the weighted mean of pixels in a digital image.

Referring to FIG. 7, to quickly find out the approximate value of the weighted mean W of the luminance value of each pixel, the original image is scaled down to a predefined percentage (e.g. 5%) of the original resolution. The pixel luminance value of the image scaled down is determined by taking the mean luminance value of the pixels in a corresponding rectangle block of the image. As illustrated in FIG. 8, to get an image scaled down of size 4×3 pixels, the original image is divided into 4×3 rectangular blocks and the mean pixel luminance value of each block is the corresponding pixel luminance value of the image scaled down. Then, a low pass filter (e.g. a 5×5 Gaussian filter) is applied to smooth the image scaled down. This step of smoothing can reduce the blocky artifact produced in the final image scaled up. Finally, the image scaled down is scaled up (e.g. by bilinear interpolation) to the original size. The weighted mean W of the luminance value of each pixel in the original image can be approximated by the luminance value of the pixel in the corresponding location of the image scaled up.

Figure 9:
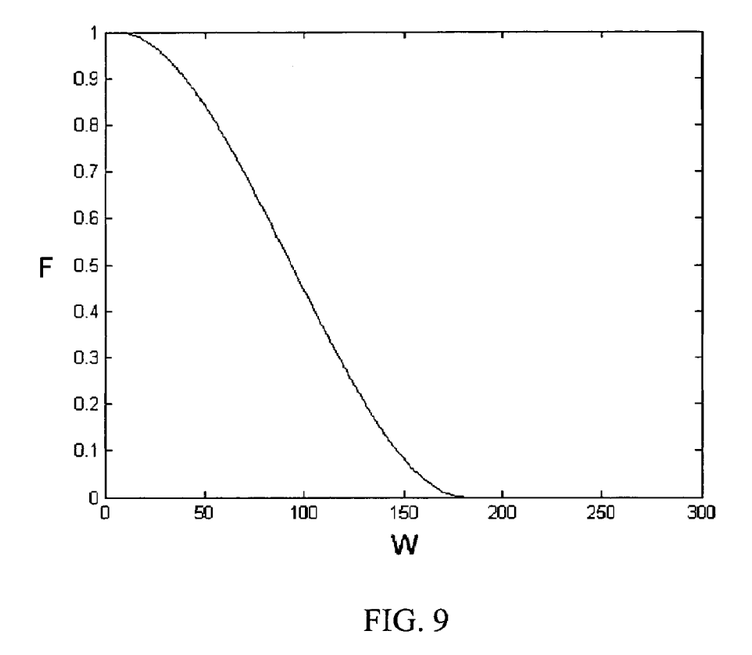
FIG. 9 shows the relationship between a weighted mean W and a shaded factor F of a pixel in a digital image.

In the processing, a large weighted mean W of a pixel indicates the area around the pixel is bright. A small weighted mean W of a pixel indicates the area around the pixel is dark. A shaded factor F for each pixel ($0 \leq F \leq 1$) based on W is defined. The relationship between W and F is shown in FIG. 9. A smaller W of a pixel results in a larger F value and that means such a pixel is shaded and needs more details enhancement. Otherwise, a larger W of a pixel results in a smaller F value and that means such a pixel is in bright area and need less details enhancement.

Details of the enhancement applied to each pixel are as follows.

Figure 10:
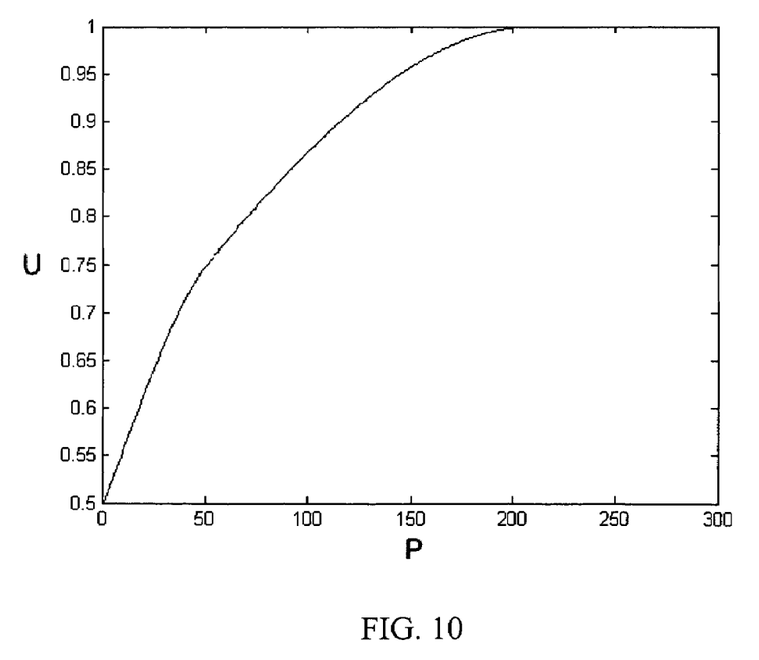
FIG. 10 shows the relationship between an underexposure parameter P and a factor U of a pixel in a digital image.

Based on the underexposure parameter P determined in the processing of the Underexposure Detection and Correction, a factor U ($0 \leq U \leq 1$) that controls the degree of a shaded details enhancement is defined. The relationship between P and U is shown in FIG. 10. For a smaller P value, the image is underexposed and it has already been corrected in the Underexposure Detection and Correction. Therefore, the image requires less shaded details enhancement and thus the parameter U is smaller. Otherwise, if P is a larger one, the image needs more shaded details enhancement and thus the parameter U is larger.

Figure 11:
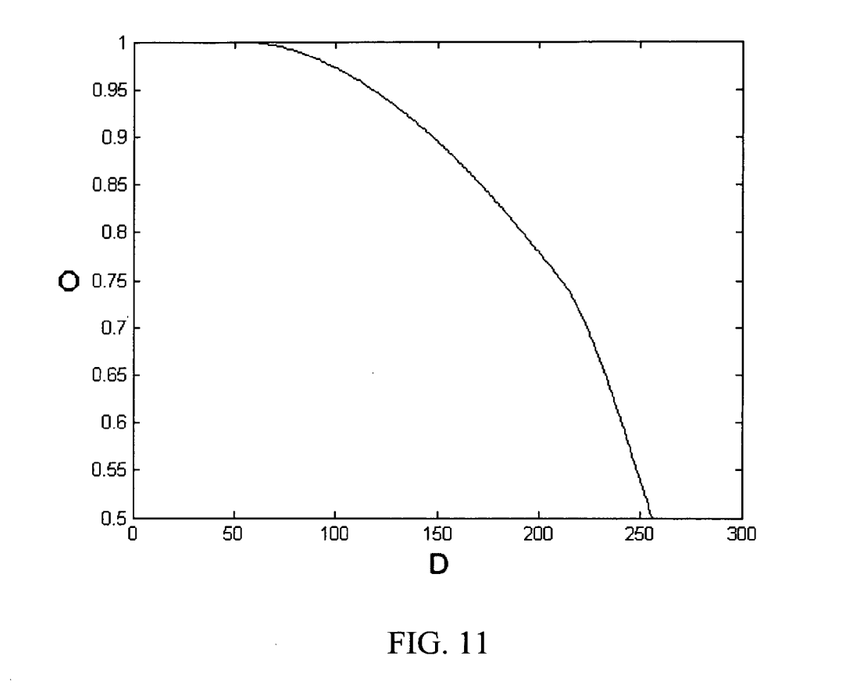
FIG. 11 shows the relationship between an overexposure parameter D and a factor O of a pixel in a digital image.

On the other hand, based on the overexposure parameter D determined in the processing of the Overexposure Detection and Correction, another factor O ($0 \leq O \leq 1$) which also controls the degree of a shaded details enhancement is defined. The relationship between D and O is shown in FIG. 11. For a larger D value, the image is determined overexposed and it has already been corrected in the Overexposure Detection and Correction. Therefore, the image requires less shaded details enhancement and thus the parameter is smaller. Otherwise, if D is a smaller one, the image needs more shaded details enhancement and thus the parameter O is larger.

Based on the above factors F, U and O, each pixel will be transformed accordingly. A details enhancement factor H ($0 \leq H \leq 1$) that controls the degree of a shaded details enhancement on the pixel. H is defined as H=F×U×O. Each pixel is enhanced according to its H value. A pixel with a larger H value needs much robust enhancement and vice versa.

Figure 12:
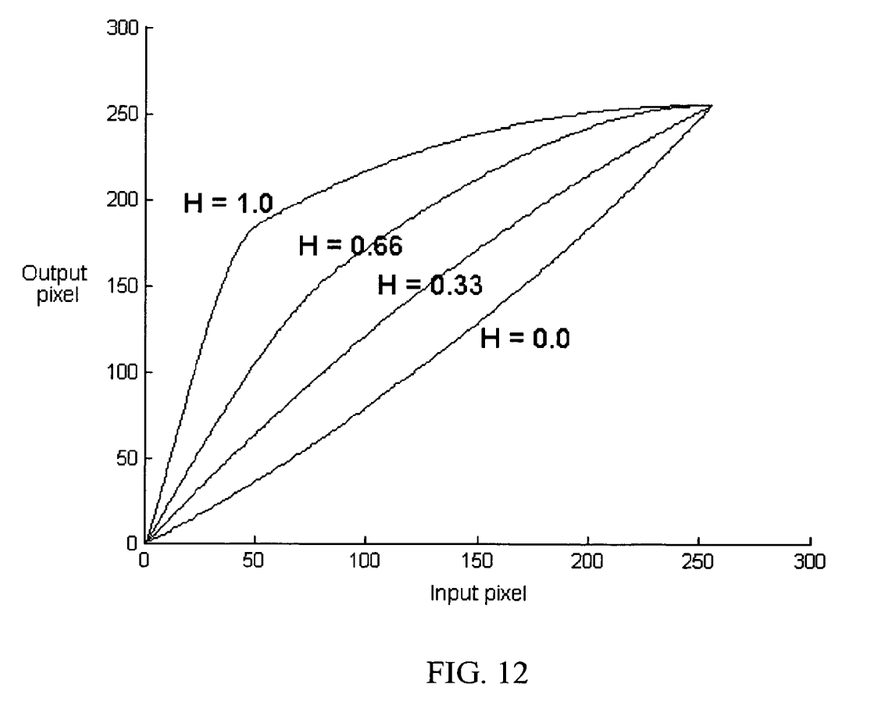
FIG. 12 shows transformation functions at different values of an enhancement factor H in the shaded details enhancement module of the invention.

As shown in FIG. 12, transformation functions at different H values are used to enhance the shaded details of an image. Each pixel is transformed by a corresponding nonlinear monotonic increasing transformation function f(m, n) based on its H value. The transformation function starts at (0, 0) and ends at (255, 255). The initial slope of the transformation function increases with the H value. For a larger H value (H_large), the transformation function f(m, H_large) will have steeper initial slope, so that dark pixels will be brightened a lot. For a smaller H value (H_small), the transformation function f(m, H_small) will have gentle initial slope. When H value is very small (e.g. H=0.0), as shown in FIG. 12, the initial slope of the transformation function is smaller than 1. This aims to darken the bright area and make the image details in bright area to have better contrast.

After processed by the shaded details enhancement correction, an image with backlighting and unevenly exposed defects can be fixed, and an image which is originally good in quality will not be degraded but is of a much better contrast.

5. Noise Removal Correction

Optionally, an image can be processed to remove noise. Especially, the images captured by the lower quality cameras will be quite noisy. After enhancement in the underexposure detection and correction, the noise of the image will be amplified and become highly visible. To improve the visual quality of the enhanced noisy image, noise will be removed.

The noise to be removed is very visible and annoying the blue chunks noise. The degree of noise removal will be based on the parameter U defined in the Underexposure Detection and Correction. A smaller U value of an image means that the input image is originally underexposed, and the image needs much robust noise removal and vice versa.

The method to remove blue chunks noise of an image needs to process on each pixel. For each pixel, if the blue (B) color value is larger than the red (R) color value and the green (G) color value, based on the blue color value, the parameter U and the maximum (RGmax) of R and G, the color value of B will be reduced to a value close to but larger than or equal to the RGmax value. A decrease in B value causes the blue chunks noise less visible. Though this processing somehow desaturates the blue color of the blue details which are originally blue in color, this noise removal is particularly useful for correcting the underexposed photos taken by a low end CMOS sensor that produces quite noisy images. For example, the B color value of a noisy image can be corrected to B' by the following formula:

$$B'=B-(B-RGmax)\times(1-RGmax/255)\times(1-U)$$

After this noise removal process, the visible blue chunks noise will be removed and the visual appearance of the whole image will look more natural and with less artifacts.

Figure 13A:
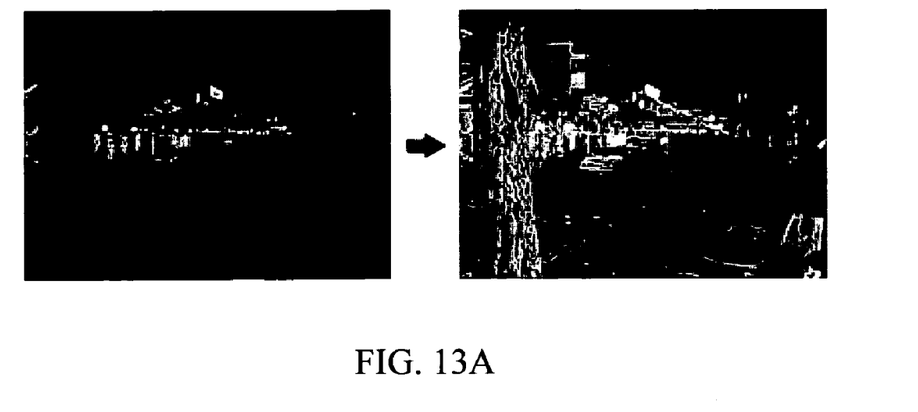
FIGS. 13A through 13E show comparisons between some digital images and those processed by the processing system of the present invention.
Figure 13B:
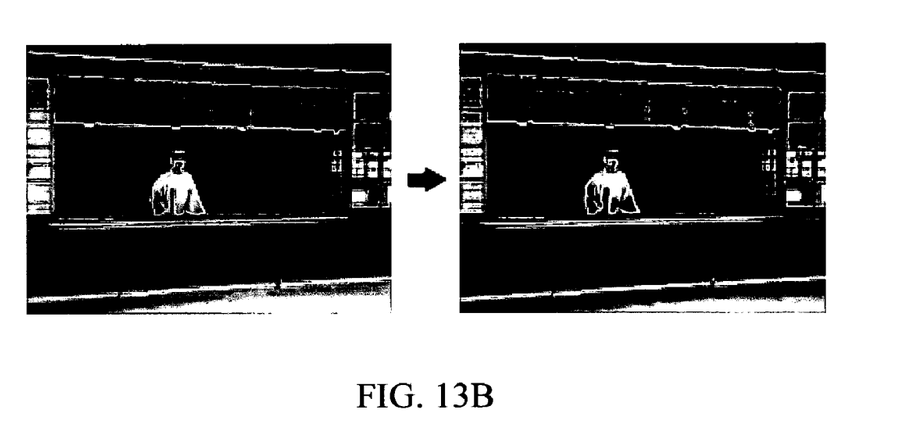
Figure 13C:
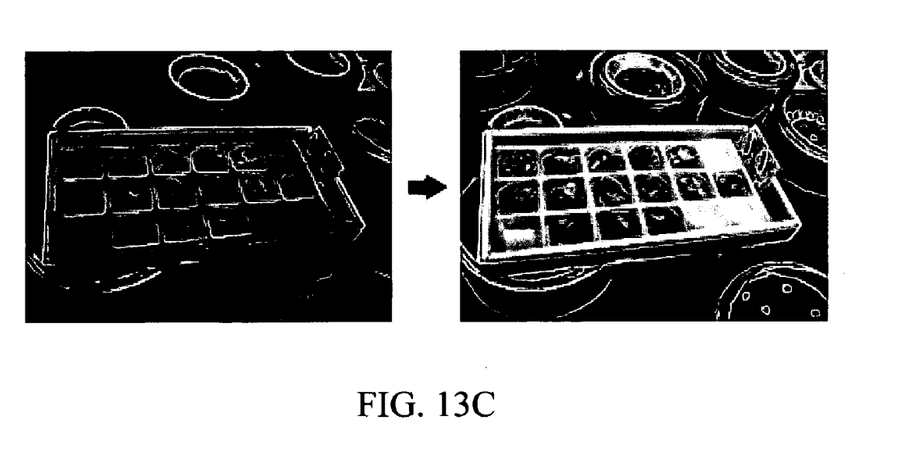
Figure 13D:
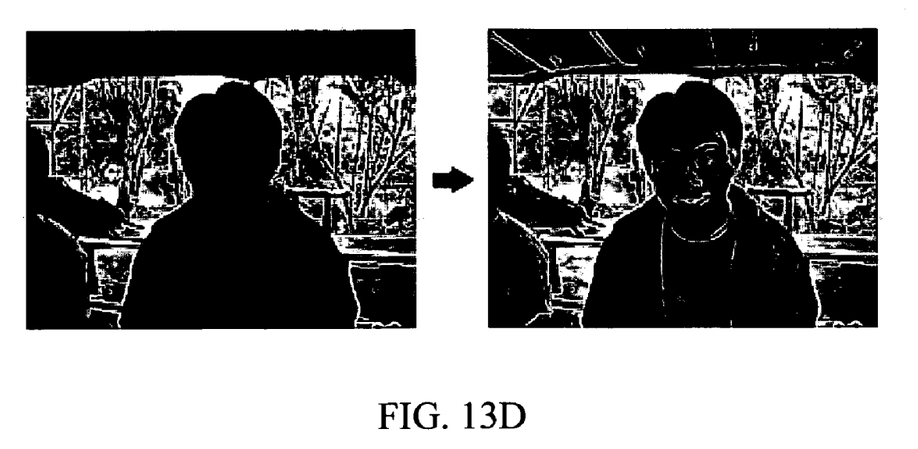
Figure 13E:
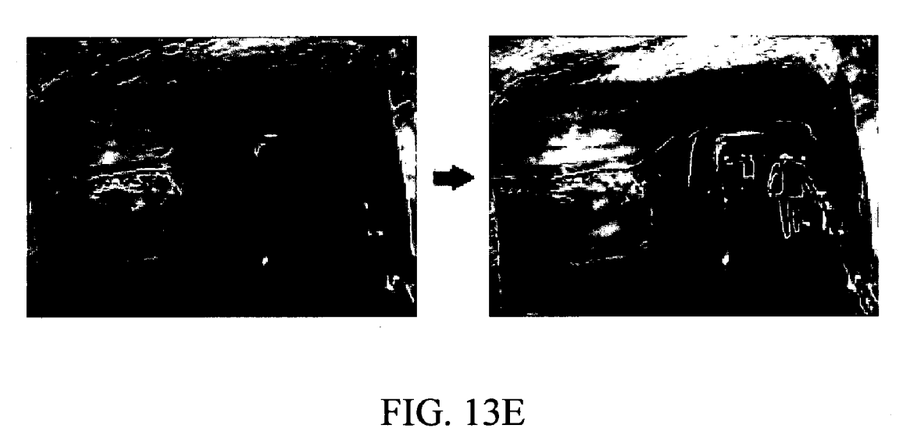

Now referring to FIGS. 13A through 13E, they show the effect of a digital image processed by the system and method of the invention. FIG. 13A illustrates the effect of a comparison of the image between the original and that after underexposure correction. FIG. 13B illustrates the effect of a comparison of the image between the original and that after overexposure correction. FIG. 13C illustrates the effect of a comparison of the image between the original and that after color casting removal. FIG. 13D illustrates the effect of a comparison of the image between the original and that after backlighting correction; FIG. 13E illustrates the effect of a comparison of an image between the original and that after uneven exposure correction. FIGS. 13D through 13E illustrated the effect of the shaded details enhancement.

This invention does not only apply to digital images. For example, this invention can be applied to videos taken by digital video cameras. For digital videos, every frame of the video is in fact a digital image. Therefore, the method of the invention can be applied on each frame of the digital video to automatically fix defects such as backlighting defects, underexposure defects, overexposure defects, contrast defects and color casting defects therein.

Besides, the invention is applicable to not only digital images or videos taken by digital cameras or digital video cameras, but also any other types of digital images like those produced by scanners or medical imaging devices.

To improve the quality and appearance of digital images or videos, the system and method of the invention can be applied in imaging processing devices such as digital cameras, digital video camera or any handheld devices with image capturing, processing, displaying and digital data storing functions. The system can be implemented as an automatic system which automatically enhances all images with or without notifying users with messages like "Correcting image". Also, the system can be implemented by providing a hot-key button, one click or one touch button through users' interaction on the input system (e.g. a keypad) of the imaging processing devices. After processed, the original and the fixed images or videos can be stored to the image processing devices and user can have options to redo or undo the operations.

The above embodiments and description are intended to illustrate the invention. It is appreciated for those skilled in the art that any modifications or changes to the invention without departure from the spirit of the invention should fall into the scope of appended claims.

The invention claimed is:

1. A method of processing a digital image comprising:
   detecting pixel color values of pixels in said digital image;
   determining whether or not a defect exists in said digital image by comparing detected pixel color values with a predetermined value; and
   correcting said defect by adjusting said detected pixel color values if said defect exists, so as to output said digital image via a digital image processing device after said defect has been corrected;
   wherein said correcting comprises:
   determining a first color casting factor of pixels in a highlight region based on a predetermined largest color value and a predetermined smallest pixel color value among maximum values of red, green and blue histograms of the pixels of said digital image; and transforming pixel color values of pixels in a highlight region to a larger pixel color value in accordance with said first color casting factor based on the following quotations, respectively:

$$R'=R\text{max}+(\text{BrightMax}-R\text{max})\times CC\text{Bright}$$

$$G'=G\text{max}+(\text{BrightMax}-G\text{max})\times CC\text{Bright}$$

$$B'=B\text{max}+(\text{BrightMax}-B\text{max})\times CC\text{Bright}$$

wherein:

Rmax, Gmax and Bmax are largest color values in red, green and blue color channels of histograms of said digital image, respectively; BrightMax is the maximum among Rmax, Gmax and Bmax; CCBright is said first color casting factor in said highlight region of said digital image; and R', G', and B' are respectively a color values of Rmax, Gmax and Bmax colors after processed.

2. The method according to claim 1, further comprising:

determining a second color casting factor of pixels in a shadow region based on a predetermined smallest color value and a predetermined largest color value among minimum values of red, green and blue histograms of the pixels of said digital image; and transforming pixel color values of pixels in a shadow region to a smaller color value in accordance with said second color casting factor based on following quotations, respectively:

$$R'=R\text{min}-(R\text{min}-\text{DarkMin})\times CC\text{Dark}$$

$$G'=G\text{min}-(G\text{min}-\text{DarkMin})\times CC\text{Dark}$$

$$B'=B\text{min}-(B\text{min}-\text{DarkMin})\times CC\text{Dark}$$

wherein:

Rmin, Gmin and Bmin are smallest color values in red, green and blue color channels of histograms of said digital image, respectively; DarkMin is the minimum among Rmin, Gmin and Bmin; CCDark is said second color casting factor in said shadow region of said digital image; and R', G', and B' are respectively a color values of Rmin, Gmin and Bmin colors after processed.

3. The method according to claim 2, further comprising:

transforming, so as to enhance visual image details, the color values of each pixel of said digital image based on a weighted mean value of luminance values of pixels within a predetermined distance adjacent to said each pixel, using a corresponding nonlinear monotonic increasing transformation function.

4. The method according to claim 3, wherein said weighted mean value is determined by a low pass filter.

5. The method according to claim 4, wherein the determining of said weighted value comprises:

scaling down said digital image from an original dimension to a predetermined dimension;

smoothing said digital image with said low pass filter;

scaling up said digital image to said original dimension to determine a luminance value of each current pixel of said digital image; and determining said weighted mean value based on the luminance value of each current pixel of said digital image.

6. The method according to claim 5, further comprising dividing said image of the original dimension into corresponding rectangle blocks, and determining the pixel color value of each pixel of said digital image scaled down by taking a mean value of the pixel luminance values of the pixels in said corresponding rectangle block.

7. The method according to claim 1, wherein said digital image processing device is a digital camera or a digital video camera.

* * * * *

UNITED STATES PATENT AND TRADEMARK OFFICE
CERTIFICATE OF CORRECTION

PATENT NO. : 7,382,928 B2 Page 1 of 1
APPLICATION NO. : 10/913895
DATED : June 3, 2008
INVENTOR(S) : Wong et al.

It is certified that error appears in the above-identified patent and that said Letters Patent is hereby corrected as shown below:

On Col. 7, Line 12, after "parameter" insert -- O --.

On Col. 9, Line 20 (Approx.), in Claim 1, before "color" delete "a".

On Col. 10, Line 7, in Claim 2, before "color" delete "a".

On Col. 10, Line 19, in Claim 5, after "weighted" insert -- mean --.

Signed and Sealed this

Seventeenth Day of March, 2009

JOHN DOLL
*Acting Director of the United States Patent and Trademark Office*